W. C. MARGEDANT.
Expanding Pulleys.

No. 148,968. Patented March 24, 1874.

Witnesses:
G. Mathys
Solon C. Kemon

Inventor:
Wm. C. Margedant
Per ⎯⎯⎯⎯
Attorneys.

UNITED STATES PATENT OFFICE.

WILLIAM C. MARGEDANT, OF HAMILTON, OHIO, ASSIGNOR TO BENTEL, MARGEDANT & CO., OF SAME PLACE.

IMPROVEMENT IN EXPANDING PULLEYS.

Specification forming part of Letters Patent No. 148,968, dated March 24, 1874; application filed March 5, 1874.

CASE A.

*To all whom it may concern:*

Be it known that I, WILLIAM C. MARGEDANT, of Hamilton, in the county of Butler and State of Ohio, have invented a new and Improved Expanding Pulley; and I do hereby declare that the following is a full, clear, and exact description of the same, reference being had to the accompanying drawing forming a part of this specification.

The invention relates to pulleys susceptible of being enlarged or diminished in diameter or circumference, to give greater or less speed to the machinery driven by them. It consists in novel means whereby this may be accomplished with facility, economy, and convenience.

Figure 4:
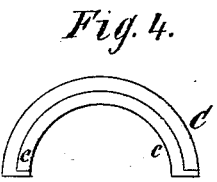
Figure 1:
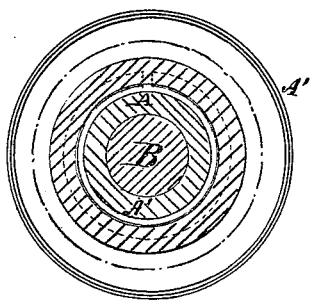
Figure 5:
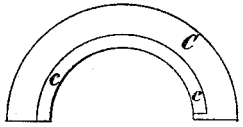
Figure 2:
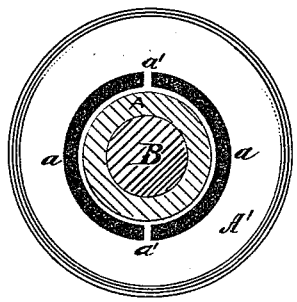
Figure 3:
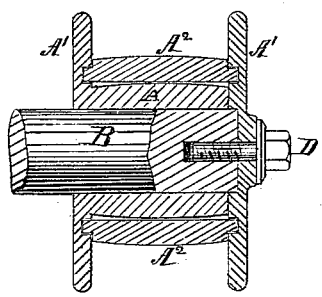

Figures 1 and 2 of drawing are sectional side elevations, Fig. 3 a longitudinal section, and Figs. 4 and 5 detail views, of the two sections of removable shell.

A represents an ordinary pulley, having flanges $A^1$ $A^1$ and working-rim $A^2$, the said pulley being keyed or otherwise rigidly attached to a shaft, B. I make one of the flanges $A^1$ separate and movable from rim $A^2$, and form in the opposite faces of the two flanges arc-grooves $a$ $a$, each groove being nearly a semi-circumference, and the two being separated by one or more cross-pieces, $a'$ $a'$, so that neither can turn or change position. C C are shell-sections, semicircular in form, and provided with curved tongues $c$ $c$, which correspond in curvature and thickness to the grooves $a$.

It will be perceived that the tongues and grooves $a$ $c$ are less than the circumference of the shell-sections, so that the latter will overlap each cross-piece $a'$, and make a close joint on their longitudinal lines of separation.

I make these shells of varying diameter or circumference, but all with the same arc-tongues $c$ $c$, so that a variety of these shells may be employed with the same pulley A.

The removable pulley-flange is held to the shaft B and rim $A^2$ by means of a clamp-screw, D, which works in a female screw or thread of shaft. The pulley-rim $A^2$ being the minimum in point of size, and the one which gives the greatest speed to the machinery, the pulley rims or shells C, of varying size, are made to inclose this, according to the degree of velocity required in the driven machinery.

The introduction of these circumjacent shells or rims is very readily made by simply turning the screw, drawing back the pulley-flange, and applying the shell.

I am aware that pulleys have been heretofore made to enlarge or diminish in the circumference of their working-faces; and, also, that a patent was granted, June 14, 1873, to H. Frank and G. Spire for a like purpose; but, in order to attach a whole outer shell on the periphery of another pulley, as much lateral motion and room are required as the face of the pulley is wide. This room or space cannot always be provided or obtained, and, with the means described by me, is unnecessary.

Having thus described my invention, what I claim is—

A pulley provided with flanges $A^1$ $A^1$, one movable, and both having arc-grooves $a$ $a$, separated by one or more cross-pieces, $a'$, as described, to adapt them to receive a series of shell or rim sections, C C, having the tongues $c$, in the manner set forth.

WM. C. MARGEDANT.

Witnesses:
CHAS. A. PETTIT,
EDWARD V. BENTON.